(12) United States Patent
Duan et al.

(10) Patent No.: US 8,881,598 B2
(45) Date of Patent: Nov. 11, 2014

(54) PRESSURE POINT INSPECTION DEVICE

(71) Applicant: Shenzhen China Star Optoelectronics Technology Co., Ltd., Shenzhen (CN)

(72) Inventors: Huifang Duan, Shenzhen (CN); Xiaoxin Zhang, Shenzhen (CN); Jungmao Tsai, Shenzhen (CN); Junjie Huang, Shenzhen (CN); Hao Jin, Shenzhen (CN); Bingcheng Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 247 days.

(21) Appl. No.: 13/697,846

(22) PCT Filed: Oct. 29, 2012

(86) PCT No.: PCT/CN2012/083693
§ 371 (c)(1),
(2), (4) Date: Nov. 14, 2012

(87) PCT Pub. No.: WO2014/063374
PCT Pub. Date: May 1, 2014

(65) Prior Publication Data
US 2014/0109683 A1    Apr. 24, 2014

(30) Foreign Application Priority Data
Oct. 23, 2012  (CN) .......................... 2012 1 0406628

(51) Int. Cl.
*G01N 3/08*    (2006.01)
*G01L 5/00*    (2006.01)

(52) U.S. Cl.
CPC ................. *G01L 5/0038* (2013.01); *G01L 5/00* (2013.01)
USPC .......................................................... 73/818

(58) Field of Classification Search
USPC .......................................................... 73/818
See application file for complete search history.

(56) References Cited

U.S. PATENT DOCUMENTS

| 5,615,039 | A  | * | 3/1997 | Henley ..................... 359/257 |
| 8,376,581 | B2 | * | 2/2013 | Auld et al. ............... 362/249.02 |
| 2005/0121429 | A1 | * | 6/2005 | Liao et al. ................ 219/121.78 |

FOREIGN PATENT DOCUMENTS

JP        2010014696    *    1/2010

* cited by examiner

*Primary Examiner* — Lisa Caputo
*Assistant Examiner* — Octavia Hollington
(74) *Attorney, Agent, or Firm* — Andrew C. Cheng

(57) ABSTRACT

The present invention discloses a pressure point inspection device, able to press on a plurality of pressure points on liquid crystal display panel for inspecting display condition, the pressure point inspection device includes: lateral adjustment board, lateral adjustment board including a first lateral board and a second lateral board; vertical adjustment board, disposed crossly on lateral adjustment board, vertical adjustment board including first vertical board and second vertical board, able to fold separately; wherein lateral adjustment board and/or vertical adjustment board disposed with a plurality of inspection heads, vertical disposition gap between first lateral board and second lateral board adjustable and lateral disposition gap between first vertical board and second vertical board adjustable. As such, the pressure point inspection device can save time of pressing pressure points on TFT-LCD and improve inspection efficiency and avoid missing pressure point.

17 Claims, 3 Drawing Sheets

PRESSURE POINT INSPECTION DEVICE

BACKGROUND OF THE INVENTION

The present application claims priority of "PRESSURE POINT INSPECTION DEVICE", application number 201210406628.2 submitted to State Intellectual Property Office, People Republic of China dated Oct. 23, 2012.

1. Field of the Invention

The present invention relates to the field of liquid crystal panel manufacturing techniques, and in particular to a pressure point inspection device.

2. The Related Arts

Thin film transistor liquid crystal display (TFT-LCD) has become an important display platform of current IT and video conferencing products. The operating theory of TFT-LCD is through appropriate voltage loading in liquid crystal layer to make the liquid crystal molecules diffract under the influence of the voltage, and to obtain different penetration ratio by different voltage control to realize displaying.

In the manufacturing process of TFT-LCD, the product requires inspecting the screen. As shown in FIG. 5, FIG. 5 is a schematic view showing the pressure points of a known liquid crystal display to be inspected by pressing, wherein the circles indicate the pressure points to be inspected by pressing.

In current inspection, a staff must manually press on each of the nine pressure points to inspect whether the screen shows any defect. For example, for a staff to manually press on each of the nine pressure points, the inspection usually takes up around four seconds. In addition, the manual inspection may accidentally miss a pressure point, leading to inaccurate inspection and resulting in poor quality.

SUMMARY OF THE INVENTION

The technical issue to be addressed by the present invention is to provide a pressure point inspection device, able to save the time required for manual inspection of pressure points on liquid crystal display panel and improve inspection efficiency as well as avoid missing pressure points.

The present invention provides a pressure point inspection device, able to press on a plurality of pressure points on liquid crystal display panel for inspecting display condition, the pressure point inspection device comprises: a lateral adjustment board, the lateral adjustment board at least comprising a first lateral board and a second lateral board; a vertical adjustment board, disposed crossly on the lateral adjustment board, the vertical adjustment board comprising at least a first vertical board and a second vertical board, able to fold separately; wherein the lateral adjustment board and/or the vertical adjustment board being disposed with a plurality of inspection heads, vertical disposition gap between the first lateral board and the second lateral board being adjustable and lateral disposition gap between the first vertical board and the second vertical board being adjustable.

According to a preferred embodiment of the present invention, the first lateral board and the second lateral board are disposed with at least a sliding trench respectively, two ends of the first vertical board are fixed to the first lateral board and the second lateral board in a rotatable manner, two ends of the second vertical board are constrained inside the sliding trench in a rotatable manner.

According to a preferred embodiment of the present invention, the first vertical board and the second lateral board respectively comprise a plurality of support rods engaged together, two adjacent support rods can be folded at engagement joint.

According to a preferred embodiment of the present invention, the plurality of lateral adjustment boards comprises a third lateral board, and the third lateral board is disposed with at least a sliding trench; the engagement joint of two adjacent support rods at central part of the first vertical board is fixed to the first lateral board, the support rods at two ends of the first vertical board are fixed to the second lateral board and the third lateral board in a rotatable manner; the engagement joint of two adjacent support rods at central part of the second vertical board is constrained inside the sliding trench of the first lateral board, the support rods at two ends of the second vertical board are constrained inside the sliding trench of the second lateral board and the third lateral board in a rotatable manner.

According to a preferred embodiment of the present invention, the plurality of vertical adjustment board further comprises a foldable third vertical board; the first lateral board and the second lateral board are respectively disposed with at least two sliding trenches, two ends of the third vertical board are constrained inside the sliding trenches of the first lateral board and the second lateral board in rotatable manner.

According to a preferred embodiment of the present invention, the third vertical board comprises a plurality of support rods engaged together, and two adjacent support rods are foldable at engagement joint.

According to a preferred embodiment of the present invention, the lateral adjustment board comprises a third lateral board, and the third lateral board is disposed with at least two sliding trenches; the engagement joint of two adjacent support rods at central part of the first vertical board is fixed to the first lateral board, the support rods at two ends of the first vertical board are fixed to the second lateral board and the third lateral board in a rotatable manner; the engagement joint of two adjacent support rods at central part of the second vertical board is respectively constrained inside the sliding trench on one side of the first lateral board, the support rods at two ends of the second vertical board are respectively constrained inside the sliding trench on one side of the second lateral board and the third lateral board in a rotatable manner; the engagement joint of two adjacent support rods at central part of the third vertical board is respectively constrained inside the sliding trench on the other side of the first lateral board, the support rods at two ends of the third vertical board are respectively constrained inside the sliding trench on the other side of the second lateral board and the third lateral board in a rotatable manner.

According to a preferred embodiment of the present invention, the first lateral board, the second lateral board and the third lateral board have the same shape, and the sliding trenches are disposed at the same location on the first lateral board, the second lateral board and the third lateral board.

According to a preferred embodiment of the present invention, the engagement joint of two adjacent support rods of the first vertical board, the second vertical board and the third vertical board is disposed with fastening screw to fasten the folding angle between the two adjacent rods.

According to a preferred embodiment of the present invention, back of the fastening screw is disposed with a handle for pull or press.

The efficacy of the present invention is that to be distinguished from the state of the art. Because the vertical disposition gap between the lateral adjustment boards and the lateral disposition gap between the vertical adjustment boards are adjustable as well as a plurality of inspection heads is disposed on the lateral adjustment board and/or the vertical adjustment board, the inspection heads of the pressure point inspection device of the present invention can all be pressed against a plurality of pressure points on the liquid crystal display panel to inspect the display condition. The present invention can save inspection time, avoid missing pressure points and has a simple structure for flexible adjustment.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to the drawings and embodiments of the present invention for detailed description.

Figure 1:
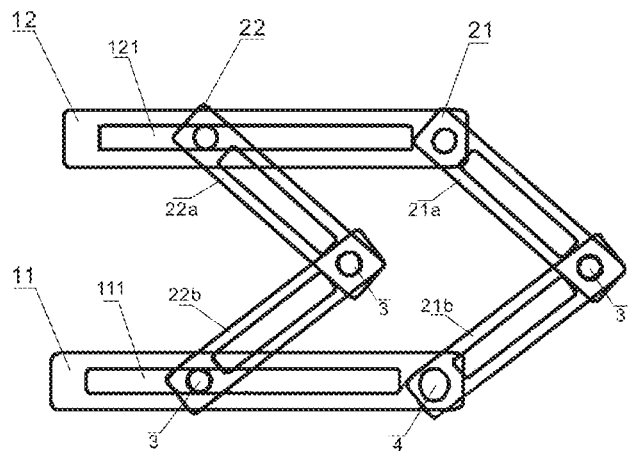
FIG. 1 is a schematic view showing the structure of a first embodiment of the pressure point inspection device according to the present invention.

Referring to FIG. 1, FIG. 1 is a schematic view showing the structure of a first embodiment of the pressure point inspection device according to the present invention.

In the instant embodiment, the pressure point inspection device comprises: a lateral adjustment board and a vertical adjustment board, disposed crossly on the lateral adjustment board, wherein the lateral adjustment board comprises two long stripe boards of the same shape, that is, a first lateral board 11 and a second lateral board 12, respectively. The first lateral board 11 and the second lateral board 12 are disposed in parallel.

The central part of the first lateral board 11 and the second lateral board 12 is disposed respectively with a sliding trench 111, 112 of the same length, for constraining the movement of vertical adjustment board.

The vertical adjustment board comprises two boards of the same shape and disposed in parallel; that is, a first vertical board 21 and a second vertical board 22. The following describes the first vertical board 21 for explaining the structure and operation of the vertical adjustment board.

The first vertical board 21 comprises two support rods 21a, 21b, of the same shape and engaged together. The engagement joint of support rods 21a, 21b is disposed with a fastening screw 3. Because two support rods 21a, 21b are engaged through joint, the two support rods 21a, 21b can be folded around the engagement joint (shown as the location of fastening screw 3 in the figure).

The two ends of support rods 21a, 21b are fixed respectively to one end of the first lateral board 11 and the second lateral board 12 in a rotatable manner.

The second vertical board 22 has the same structure as the first vertical board 21, and comprises two support rods 22a, 22b, of the same shape and engaged together. One end of the support rod 22a is constrained inside the sliding trench 111 of the first lateral board 11, and one end of support rod 22b is constrained inside the sliding trench 121 of the second lateral board 12.

After assembly, two support rods 21a, 21b of the first vertical board 21 are respectively parallel to two support rod 22a, 22b of the second vertical board 22.

When the first vertical board 21 and the second vertical board 22 are folded, because the fixed end of support rods 21a, 21b with the first lateral board 11 and the second lateral board 12 can rotate with respect to the support rods 22a, 22b and sliding trenches 111, 121, the linked structure can realize the linked movement. In the process, the first vertical board 21 and be folded synchronously with the second vertical board 22. At the same time, the first lateral board 11 and the second lateral board 12 can also maintain parallel disposition.

In the process of repetitive folding and unfolding of support rods 21a, 21b, 22a, 22b, the vertical disposition gap between the first lateral board 11 and the second lateral board 12 can be changed.

The function of the fastening screw 3 disposed on the first vertical board 21 and the second vertical board 22 is: after the gap between the first lateral board 11 and the second lateral board 12 is appropriately adjusted, the fastening screw 3 can be tightened to fasten the relative angle of support rods 21a and 21b and support rods 22a, 22b to realize the fastening of the gap between the lateral adjustment boards.

In the instant embodiment, the ends of support rods 21a, 21b, 22a, 22b connected to the first lateral board 11 and the second lateral board 12 are disposed with inspection head (not shown). The four inspection heads are in the same plane.

In the instant embodiment, the inspection head is a rubber head for pressing the pressure point.

The two ends of the second vertical board 22 are constrained respectively inside the sliding trenches 111, 121 in rotatable manner so that the two adjacent support rods 22a, 22b of the second vertical board 22 can slide along the sliding trenches 111, 121. As such, the rubber heads for pressing at the ends of support rods 22a, 22b can synchronously slide laterally. During the back and forth sliding of support rods 22a, 22b, the lateral disposition gap between the first vertical board 21 and the second vertical board 22 can be changed.

In summary, through adjusting the gap between the two lateral boards and the gap between the two vertical boards, the positions of the rubber heads can be adjusted to realize matching the rubber head with a plurality of areas of TFT-LCD.

Furthermore, a handle 4 can be disposed at the plurality of vertical adjustment boards or the plurality of vertical adjustment boards for pulling up or pressing down the entire device.

In the instant embodiment, the handle 4 can be disposed at the connection location of the first lateral board 11 and the first vertical board 21.

Furthermore, the plurality of vertical adjustment boards or the plurality of vertical adjustment boards can be made of transparent material, such as, acrylic, to ensure the viewing of the screen display when the inspection device is pressed on the display panel.

Specifically, through loosening fastening screws 3, the gaps of the rubber heads on the vertical adjustment board can be adjusted to match the gap between the pressure points of the TFT-LCD to be inspected, and then the fastening screws 3 are tightened to fasten the rubber heads.

Figure 2:
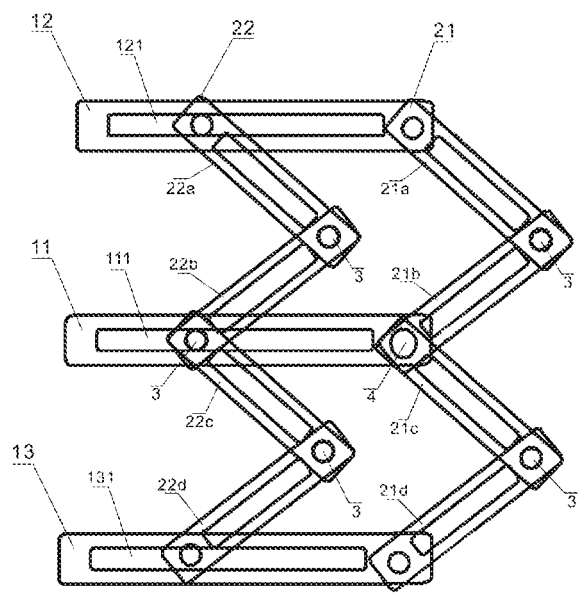
FIG. 2 is a schematic view showing the structure of a second embodiment of the pressure point inspection device according to the present invention.

FIG. 2 is a schematic view showing the structure of a second embodiment of the pressure point inspection device according to the present invention.

The present embodiment differs from the first embodiment in that: the plurality of lateral adjustment boards further comprises a third lateral board 13 of the same shape and size as the first lateral board 11. The third lateral board 13 is located below the first lateral board 11, and is also disposed with sliding trench 131 parallel to the sliding trenches 111, 121.

The first vertical board 21 comprises four support rods 21*a*, 21*b*, 21*c*, 21*d* of the same shape and size, and engaged sequentially by joints. The second vertical board 22 comprises four support rods 22*a*, 22*b*, 22*c*, 22*d* of the same shape and size, and engaged sequentially by joints. Each of the six connected positions of the two vertical boards 21, 22 and three lateral boards 11, 12, 13 is disposed with a rubber head for pressing, and all the rubber heads are in the same plane. A fastening screw 3 is disposed at the joint of two adjacent support rods.

In the instant embodiment, the support rods 21*b*, 21*c* at central part of the first vertical board 21 are fixed to the first lateral board 11 in rotatable manner. The two ends of the first vertical board 21 (i.e., the ends of support rods 21*a*, 21*d*) are fixed respectively to the ends of the second lateral board and the third lateral board.

The engagement joint of support rods 22*b*, 22*c* at central part of the second vertical board 22 is constrained inside the sliding trench 111 of the first lateral board 11 in rotatable manner. The two ends of the second vertical board 22 (i.e., the ends of support rods 22*a*, 22*d*) are constrained respectively inside the sliding trench 121 of the second lateral board 12 and the sliding trench 131 of the third lateral board 13.

Figure 3:
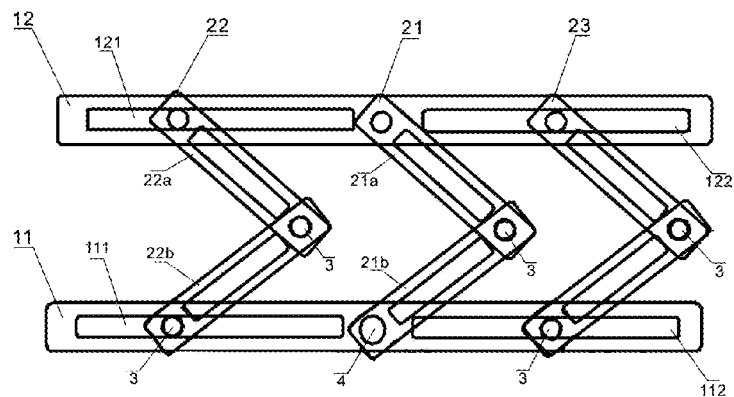
FIG. 3 is a schematic view showing the structure of a third embodiment of the pressure point inspection device according to the present invention.

FIG. 3 is a schematic view showing the structure of a third embodiment of the pressure point inspection device according to the present invention.

The present embodiment differs from the first embodiment in that: the plurality of vertical adjustment boards further comprises a foldable third vertical board 23 of the same shape and structure as the first vertical board 21.

The first lateral board 11 is disposed with two sliding trenches 111, 112 on two sides, and the second lateral board 12 is disposed with two sliding trenches 121, 122 on two sides. The two ends of the third vertical board 23 are constrained respectively inside the sliding trenches 112, 122. At the same time, each of the six connected positions of the three vertical boards 21, 22, 23 and two lateral boards 11, 12 is disposed with a rubber head for pressing, and all the rubber heads are in the same plane.

Figure 4:
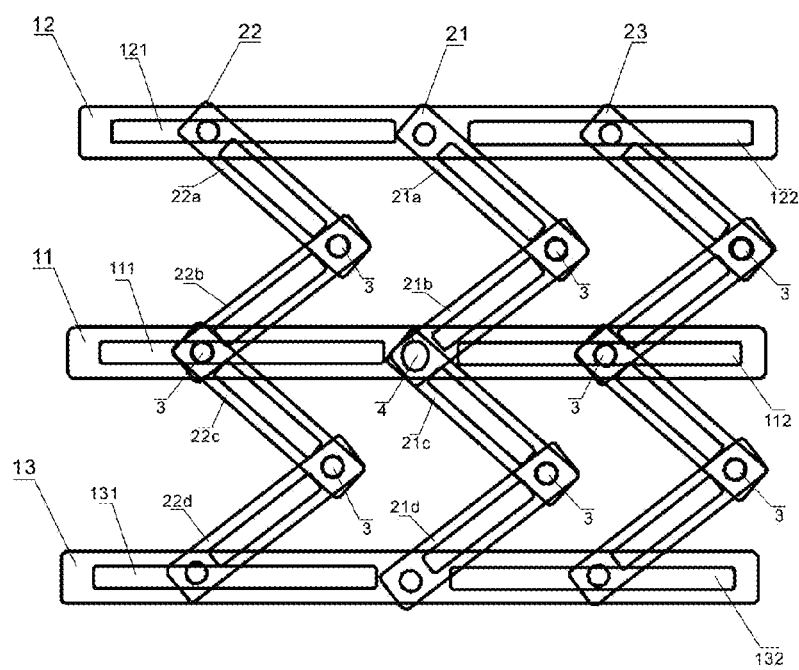
FIG. 4 is a schematic view showing the structure of a fourth embodiment of the pressure point inspection device according to the present invention.
Figure 5:
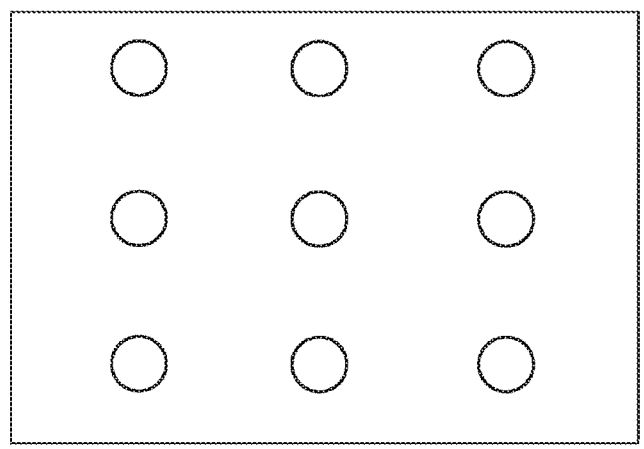
FIG. 5 is a schematic view showing the pressure points of a known liquid crystal display to be inspected by pressing.

FIG. 4 is a schematic view showing the structure of a fourth embodiment of the pressure point inspection device according to the present invention.

The present embodiment differs from the third embodiment in that: the plurality of lateral adjustment boards further comprises a third lateral board 13 of the same shape and size as the first lateral board 11. The third lateral board 13 is located below the first lateral board 11, and is also disposed with sliding trench 131, 132 parallel to the sliding trenches 111, 112 of the third embodiment.

In the instant embodiment, the three vertical boards have the same structure as the first vertical board of the second embodiment. As such, each of the nine connected positions of the three foldable vertical boards 21, 22, 23 and three lateral boards 11, 12, 13 is disposed with a rubber head for pressing, and all the rubber heads are in the same plane.

Specifically, when a liquid crystal display panel is required to inspect nine pressure points, the fourth embodiment of the present invention can perform the inspection on nine pressure points in a second. Compared to manual inspection, three seconds are saved to improve efficiency.

In summary, the pressure point inspection device of the present invention can be designed to comprise different number of rubber heads for pressing and the gap between rubber heads is adjustable in accordance with the gap between the pressure points of the display screen to realize the press inspection on a plurality of areas of TFT-LCD simultaneously.

The efficacy of the present invention is that to be distinguished from the state of the art. Because the vertical disposition gap between the lateral adjustment boards and the lateral disposition gap between the vertical adjustment boards are adjustable as well as a plurality of inspection heads is disposed on the lateral adjustment board and/or the vertical adjustment board, the inspection heads of the pressure point inspection device of the present invention can all be pressed against a plurality of pressure points on the liquid crystal display panel to inspect the display condition. The present invention can save inspection time, avoid missing pressure points and has a simple structure for flexible adjustment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A pressure point inspection device, able to press on a plurality of pressure points on liquid crystal display panel for inspecting display condition, the pressure point inspection device comprises:
    a lateral adjustment board, the lateral adjustment board at least comprising a first lateral board and a second lateral board;
    a vertical adjustment board, disposed crossly on the lateral adjustment board, the vertical adjustment board comprising at least a first vertical board and a second vertical board, able to fold separately;
    wherein at least one of the lateral adjustment board and the vertical adjustment board being disposed with a plurality of inspection heads, vertical disposition gap between the first lateral board and the second lateral board being adjustable and lateral disposition gap between the first vertical board and the second vertical board being adjustable;
    the first vertical board and the second lateral board respectively comprising a plurality of support rods engaged together, two adjacent support rods able to fold at engagement joint.

2. The pressure point inspection device as claimed in claim 1, characterized in that engagement joints of two adjacent support rods of the first vertical board and the second vertical board are disposed respectively with a fastening screw for fastening relative folding angle of two adjacent support rods.

3. The pressure point inspection device as claimed in claim 2, characterized in that a handle for pulling up or pressing down is disposed at a back of the fastening screw.

4. The pressure point inspection device as claimed in claim 2, characterized in that the first lateral board and the second lateral board are disposed with at least a sliding trench respectively, two ends of the first vertical board are fixed to the first lateral board and the second lateral board in a rotatable manner, two ends of the second vertical board are constrained inside the sliding trench in a rotatable manner.

5. The pressure point inspection device as claimed in claim 4, characterized in that the plurality of lateral adjustment boards comprises a third lateral board, and the third lateral board is disposed with at least a sliding trench;
the engagement joint of two adjacent support rods at central part of the first vertical board is fixed to the first lateral board, the support rods at two ends of the first vertical board are fixed to the second lateral board and the third lateral board in a rotatable manner;
the engagement joint of two adjacent support rods at central part of the second vertical board is constrained inside the sliding trench of the first lateral board, the support rods at two ends of the second vertical board are constrained inside the sliding trench of the second lateral board and the third lateral board in a rotatable manner;
the plurality of vertical adjustment board further comprises a foldable third vertical board;
the first lateral board and the second lateral board are respectively disposed with at least two sliding trenches, two ends of the third vertical board are constrained inside the sliding trenches of the first lateral board and the second lateral board in rotatable manner.

6. The pressure point inspection device as claimed in claim 5, characterized in that the first lateral board, the second lateral board and the third lateral board have the same shape and locations of sliding trenches are the same.

7. The pressure point inspection device as claimed in claim 6, characterized in that the third vertical board comprises a plurality of support rods engaged together by joint, two adjacent support rods can fold at engagement joint.

8. A pressure point inspection device, able to press on a plurality of pressure points on liquid crystal display panel for inspecting display condition, the pressure point inspection device comprises:
a lateral adjustment board, the lateral adjustment board at least comprising a first lateral board and a second lateral board;
a vertical adjustment board, disposed crossly on the lateral adjustment board, the vertical adjustment board comprising at least a first vertical board and a second vertical board, able to fold separately;
wherein at least one of the lateral adjustment board and the vertical adjustment board being disposed with a plurality of inspection heads, vertical disposition gap between the first lateral board and the second lateral board being adjustable and lateral disposition gap between the first vertical board and the second vertical board being adjustable.

9. The pressure point inspection device as claimed in claim 8, characterized in that the first lateral board and the second lateral board are disposed with at least a sliding trench respectively, two ends of the first vertical board are fixed to the first lateral board and the second lateral board in a rotatable manner, two ends of the second vertical board are constrained inside the sliding trench in a rotatable manner.

10. The pressure point inspection device as claimed in claim 9, characterized in that the first vertical board and the second lateral board respectively comprise a plurality of support rods engaged together by joint, two adjacent support rods can fold at engagement joint.

11. The pressure point inspection device as claimed in claim 10, characterized in that the plurality of lateral adjustment boards comprises a third lateral board, and the third lateral board is disposed with at least a sliding trench;
the engagement joint of two adjacent support rods at central part of the first vertical board is fixed to the first lateral board, the support rods at two ends of the first vertical board are fixed to the second lateral board and the third lateral board in a rotatable manner;
the engagement joint of two adjacent support rods at central part of the second vertical board is constrained inside the sliding trench of the first lateral board, the support rods at two ends of the second vertical board are constrained inside the sliding trench of the second lateral board and the third lateral board in a rotatable manner.

12. The pressure point inspection device as claimed in claim 10, characterized in that the plurality of vertical adjustment board further comprises a foldable third vertical board;
the first lateral board and the second lateral board are respectively disposed with at least two sliding trenches, two ends of the third vertical board are constrained inside the sliding trenches of the first lateral board and the second lateral board in rotatable manner.

13. The pressure point inspection device as claimed in claim 12, characterized in that the third vertical board comprises a plurality of support rods engaged together by joint, two adjacent support rods can fold at engagement joint.

14. The pressure point inspection device as claimed in claim 13, characterized in that the lateral adjustment board comprises a third lateral board, and the third lateral board is disposed with at least two sliding trenches;
the engagement joint of two adjacent support rods at central part of the first vertical board is fixed to the first lateral board, the support rods at two ends of the first vertical board are fixed to the second lateral board and the third lateral board in a rotatable manner;
the engagement joint of two adjacent support rods at central part of the second vertical board is respectively constrained inside the sliding trench on one side of the first lateral board, the support rods at two ends of the second vertical board are respectively constrained inside the sliding trench on one side of the second lateral board and the third lateral board in a rotatable manner;
the engagement joint of two adjacent support rods at central part of the third vertical board is respectively constrained inside the sliding trench on the other side of the first lateral board, the support rods at two ends of the third vertical board are respectively constrained inside the sliding trench on the other side of the second lateral board and the third lateral board in a rotatable manner.

15. The pressure point inspection device as claimed in claim 14, characterized in that the first lateral board, the second lateral board and the third lateral board have the same shape and locations of sliding trenches are the same.

16. The pressure point inspection device as claimed in claim 15, characterized in that engagement joints of two adjacent support rods of the first vertical board, the second vertical board and the third vertical board are disposed respectively with a fastening screw for fastening relative folding angle of two adjacent support rods.

17. The pressure point inspection device as claimed in claim 16, characterized in that a handle for pulling up or pressing down is disposed at a back of the fastening screw.

* * * * *